(12) United States Patent
Patil et al.

(10) Patent No.: US 7,620,600 B2
(45) Date of Patent: Nov. 17, 2009

(54) SYSTEMS AND METHODS FOR MULTIPLE SESSIONS DURING AN ON-LINE TRANSACTION

(75) Inventors: Sanjaykumar Hanmantrao Patil, Cupertino, CA (US); Rajesh G. Shakkarwar, Cupertino, CA (US)

(73) Assignee: Verient, Inc., San Jose, CA (US)

( * ) Notice: Subject to any disclaimer, the term of this patent is extended or adjusted under 35 U.S.C. 154(b) by 0 days.

(21) Appl. No.: 11/943,792

(22) Filed: Nov. 21, 2007

(65) Prior Publication Data

US 2008/0120229 A1 May 22, 2008

Related U.S. Application Data

(63) Continuation-in-part of application No. 11/562,353, filed on Nov. 21, 2006, now Pat. No. 7,548,890.

(51) Int. Cl.
*G06Q 40/00* (2006.01)
*G06F 3/048* (2006.01)

(52) U.S. Cl. .......................... 705/39; 715/808; 715/975

(58) Field of Classification Search ................ 715/808, 715/975, FOR. 197
See application file for complete search history.

(56) References Cited

U.S. PATENT DOCUMENTS

| | | | |
|---|---|---|---|
| 6,233,565 B1 | 5/2001 | Lewis et al. | |
| 6,263,447 B1 | 7/2001 | French et al. | |
| 6,766,373 B1 * | 7/2004 | Beadle et al. | 709/227 |
| 6,871,278 B1 | 3/2005 | Sciupac | |
| 7,162,475 B2 | 1/2007 | Ackerman | |
| 7,292,999 B2 | 11/2007 | Hobson et al. | |
| 2001/0047297 A1 * | 11/2001 | Wen | 705/14 |
| 2005/0119979 A1 | 6/2005 | Murashita et al. | |
| 2005/0246292 A1 | 11/2005 | Sarcanin | |
| 2006/0106734 A1 | 5/2006 | Hoffman et al. | |
| 2006/0173781 A1 | 8/2006 | Donner | |
| 2006/0177061 A1 | 8/2006 | Orsini et al. | |

(Continued)

FOREIGN PATENT DOCUMENTS

JP 02-101573 4/1990

(Continued)

OTHER PUBLICATIONS iCharge (http://web.archive.org/web/20060819032423/http://www.xilo.com/icharge.htm).*

(Continued)

*Primary Examiner*—Thomas A Dixon
*Assistant Examiner*—William E Rankins
(74) *Attorney, Agent, or Firm*—Patterson & Sheridan, LLP

(57) ABSTRACT

The present invention generally relates to a system and a method for establishing a separate session during an on-line session. In one aspect, a method for establishing a session with a server during an on-line transaction session is provided. The method includes detecting an on-line payment page and inserting a code into the on-line payment page, wherein the code is scripted to open a first pop-up window. The method further includes prompting a user via the first pop-up to answer a question, wherein the question is used to determine if a secure payment process is to be used. Additionally, the method includes opening the session with the server via a second pop-up window if the answer to the question is affirmative.

21 Claims, 6 Drawing Sheets

U.S. PATENT DOCUMENTS

| | | |
|---|---|---|
| 2006/0212407 A1 | 9/2006 | Lyon |
| 2006/0242058 A1 | 10/2006 | Torto |
| 2007/0053518 A1 | 3/2007 | Tompkins et al. |
| 2007/0142032 A1 | 6/2007 | Balsillie |

OTHER PUBLICATIONS

ZefaMedia (http://www.zefamedia.co.nz/blog/2006/4/13/environmentally-friendlier-pop-ups.html).* taming the beast.net http://web.archive.org/web/20051024002014/http://www.tamingthebeast.net/articles3/popu... Apr. 2, 2009.* icharge http://web.archive.org/web/20060819032423/http://www.xilo.com/icharge.htm.* ichargepopup1 http://www.xilo.com/demo/school/ecomm1.htm.* ichargepopup https://secure.xilo.com/icharge/veripay1.xilo.* http://web.archive.org/web/20060819032423/http://www.xilo.com/icharge.htm.* http://web.archive.org/web/20051024002014/http://www.tamingthebeast.net/articles3/popup-popover.htm Beyond the popup—popover advertising and generator software.*

U.S. Appl. No. 11/562,353. Notice of Allowance dated Apr. 20, 2009 (provided as explanation of relevance of JP 02-101573).

International Search Report. Jul. 8, 2008.

International Search Report. Sep. 29, 2008.

U.S. Appl. No. 11/668,541, Office Action dated Jun. 23, 2009.

* cited by examiner

Merchant.com https://secure.merchant.com/checkout/shippingbilling.asp?straction=

WORLD WIDE WEB

Item
Classic Dress Shirt
Unit Price: $89.50
Color: Light Blue
SIZE: 16 - 33
STYLE: 124649
Usually arrives in 5-8 business days.
Add a Gift Box or Note

Summary
Qty    Total

PAYMENT  Close | Logout | Help

Financial Institution

ONE TIME CARD — Financial Institution
4465-4201-4409-4133
Valid Through 12/31/07
John Smith
097
This card is issued by Financial Institution

| CHECK CARD | View spending for your accounts sorted by category for FREE |
| CREDIT CARD | |
| ONLINE BILLPAY | MY SPENDING REPORT ▶ |

TODAY
Monitor your account activity with FREE alerts
Learn How ▲

Revise Card    Generate New Card

— 325
— 365
— 370

Payment Information
Pay with a Credit Card
Card Type: Merchant Card
Card Number: (no hyphens or spaces)
Expiration Date
Billing Address Add Billing Address | Edit Billing Address
☑ Save my credit card information
Your billing address must match the address on your credit card statement or your credit card may be denied.

Pay with a Gift Card
Only one gift card may be used per order. For details on using your gift card click here.
Gift Card Number:
Access Number:      A 3-digit number on the back, upper-right corner of your card.
Update my order with Gift Card
Update

— 380

SYSTEMS AND METHODS FOR MULTIPLE SESSIONS DURING AN ON-LINE TRANSACTION

CROSS-REFERENCE TO RELATED APPLICATIONS

This application is a continuation-in-part of co-pending U.S. patent application Ser. No. 11/562,353, filed Nov. 21, 2006 now U.S. Pat. No. 7,548,890, which is herein incorporated by reference.

BACKGROUND OF THE INVENTION

1. Field of the Invention

Embodiments of the present invention generally relate to a system for use in an on-line transaction. More specifically, the invention relates to establishing a session with a server during the on-line transaction.

2. Description of the Related Art

Online advertising has increased over the last several years. One form of online advertising is through the use of a pop-up advertisement via a pop-up window. Generally, the pop-up window is an interface display area that appears (i.e. "pops up") in the foreground of a visual interface. The pop-up window can be initiated by a mouse click or a timed event. As internet commerce has increased, so has the use of pop-up advertisement.

The barrage of undesired pop-up advertisements has resulted in an increasingly widespread implementation of pop-up restricting mechanisms, such as pop-up blockers. A pop-up blocker is generally a program that prevents a pop-up window from displaying in a user's Web browser. The pop-up blocker is becoming a standard feature on Web browsers. A problem with pop-up blockers is that they cannot always differentiate between an undesired pop-up window and a desired pop-up window.

The pop-up window may also be used by a web application to establish a session with another web application. However, since regular window pop-ups are oftentimes blocked by pop-up blockers, an in-window pop-up may be used. Generally, the in-window pop-up is a separate window within an HTML page that has the appearance of a pop-up. Even though the in-window pop-up is typically not blocked by the pop-up blocker, the in-window pop-up fails to function properly when a session with another website is required to be established in the in-window pop-up.

As the forgoing illustrates, there is a need in the art for a system and method for establishing a session with another web application that is not blocked by pop-up blockers.

SUMMARY OF THE INVENTION

The present invention generally relates to a system and a method for establishing a separate session during an on-line session. In one aspect, a method is provided for processing an on-line payment transaction. The method includes detecting an on-line payment page and inserting code into the on-line payment page, wherein the code is configured to generate a display area mimicking the appearance of a pop-up window. The method further includes prompting a user via the display area to select whether to use a secure payment process in processing the on-line payment transaction. The method also includes opening a first pop-up window in response to the user selecting to use the secure payment process. Additionally, the method includes establishing a network session between the first pop-up window and a server.

In another aspect, a computer-readable medium is provided that includes a set of instructions that when executed by a processor cause the processor to process an on-line payment transaction. The processor performs the steps of detecting an on-line payment page and inserting code into the on-line payment page, wherein the code is configured to generate a display area mimicking the appearance of a pop-up window. The processor also performs the step of prompting a user via the display area to select whether to use a secure payment process in processing the on-line payment transaction. Further, the processor performs the step of opening a first pop-up window in response to the user selecting to use the secure payment process. Additionally, the processor performs the step of establishing a network session between the first pop-up window and a server.

In yet a further aspect, system establishing a session during an on-line transaction session is provided. The system includes a processor. The system also includes a memory, wherein the memory includes a program configured to detect an on-line payment page and insert code into the on-line payment page, wherein the code is configured to generate a display area mimicking the appearance of a pop-up window. The program is also configured to prompt a user via the display area to select whether to use a secure payment process in processing the on-line payment transaction. Further, the program is configured to open a first pop-up window in response to the user selecting to use the secure payment process. Additionally, the program is configured to establish a network session between the first pop-up window and a server.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3-6 are conceptual illustrations depicting how different servers interact with a user, according to one embodiment of the invention.

DETAILED DESCRIPTION

In general, the invention relates to a system and a method for applying a combination of an in-window pop-up and a standard window pop-up wired together in such a way that launching a session in a pop-up is established without getting blocked by pop-up blockers. The invention will be described herein in relation to a system for use in facilitating a payment transaction with an on-line merchant. However, it should be understood that the invention may be employed with any system that is configured to launch a session in a pop-up window without departing from the principles of the present invention. To better understand the novelty of the system of the present invention and the methods of use thereof, reference is hereafter made to the accompanying drawings.

Figure 1:
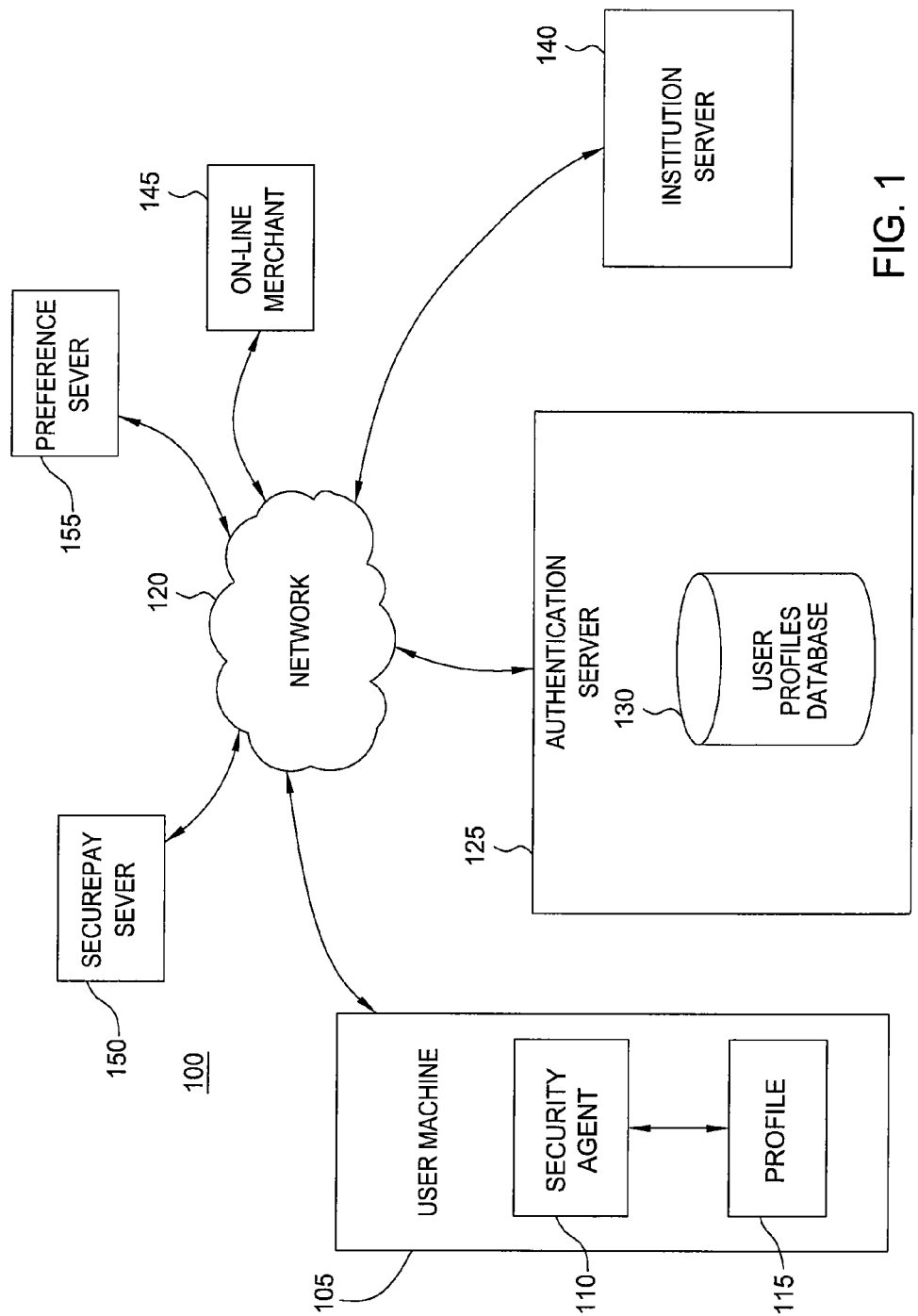
FIG. 1 is a conceptual block diagram of a system configured to facilitate an on-line transaction, according to one embodiment of the invention.

FIG. 1 is a conceptual block diagram of a system 100 configured to facilitate an on-line transaction, according to one embodiment of the invention. The system 100 includes a user machine 105, which may be any type of individual computing device such as, for example, a desk-top computer, a lap-top computer, a hand-held phone device, or a personal digital assistant. Generally, the user machine 105 is configured to be a communication link between the user and the other components in the system 100.

The system 100 further includes a network 120, which may be any type of data network, such as a local area network (LAN), a wide area network (WAN), or the Internet. The network 120 is configured to act as a communication pathway between the user machine 105, an authentication server 125, an institution server 140, an on-line merchant 145, a secure-pay server 150 and a preference server 155.

Generally, the authentication server 125 interacts with the user machine 105 and the institution server 140 via the network 120 during an authentication procedure. The institution server 140 stores sensitive information for the user e.g., financial account information, confidential data, etc. The institution server 140 may be part of a bank, a building society, a credit union, a stock brokerage, or other businesses holding sensitive data.

The user machine 105 includes a security agent 110 which is configured to provide the user with the capability of performing a secure access transaction or a secure payment transaction as described in U.S. patent application Ser. No. 11/562,353, which is incorporated herein by reference. During the secure access transaction and the secure payment transaction, the security agent 110 interacts with the authentication server 125 which compares data from the user and the user machine 105 with a user profile 115 stored in the user profiles database 130 to authenticate the identity of the user before proceeding with the transaction. As discussed herein, the security agent 110 is also configured to interact with the institution server 140, the on-line merchant 145, the secure-pay server 150 and the preference server 155.

The system 100 also includes the securepay server 150 which is configured to generate a virtual card and manage the card life cycle. As described herein, the securepay server 150 interacts with the user via the user machine 105 during a secure payment transaction and subsequently generates the virtual card as a transaction instrument. Further, the secure-pay server 150 provides a mapping service to the institution server 140 for transforming the virtual card transaction into a real payment instrument. Additionally, it should be noted that the virtual card may be a card that may be used multiple of times or a one-time card.

The system 100 further includes the preference server 155 which is configured to manage the institution preferences of the user. Generally, the preference server 155 will track and manage the multi-institution registrations of the user preferences. For instance, if the user has an account at a first institution and a second institution, the user may select a preferable institution (i.e. the first institution or the second institution) for use during the secure payment transaction. The selection data is stored on the preference server 155 and subsequently used during the secure payment transaction to connect with the previously selected preferred institution.

Figure 2:
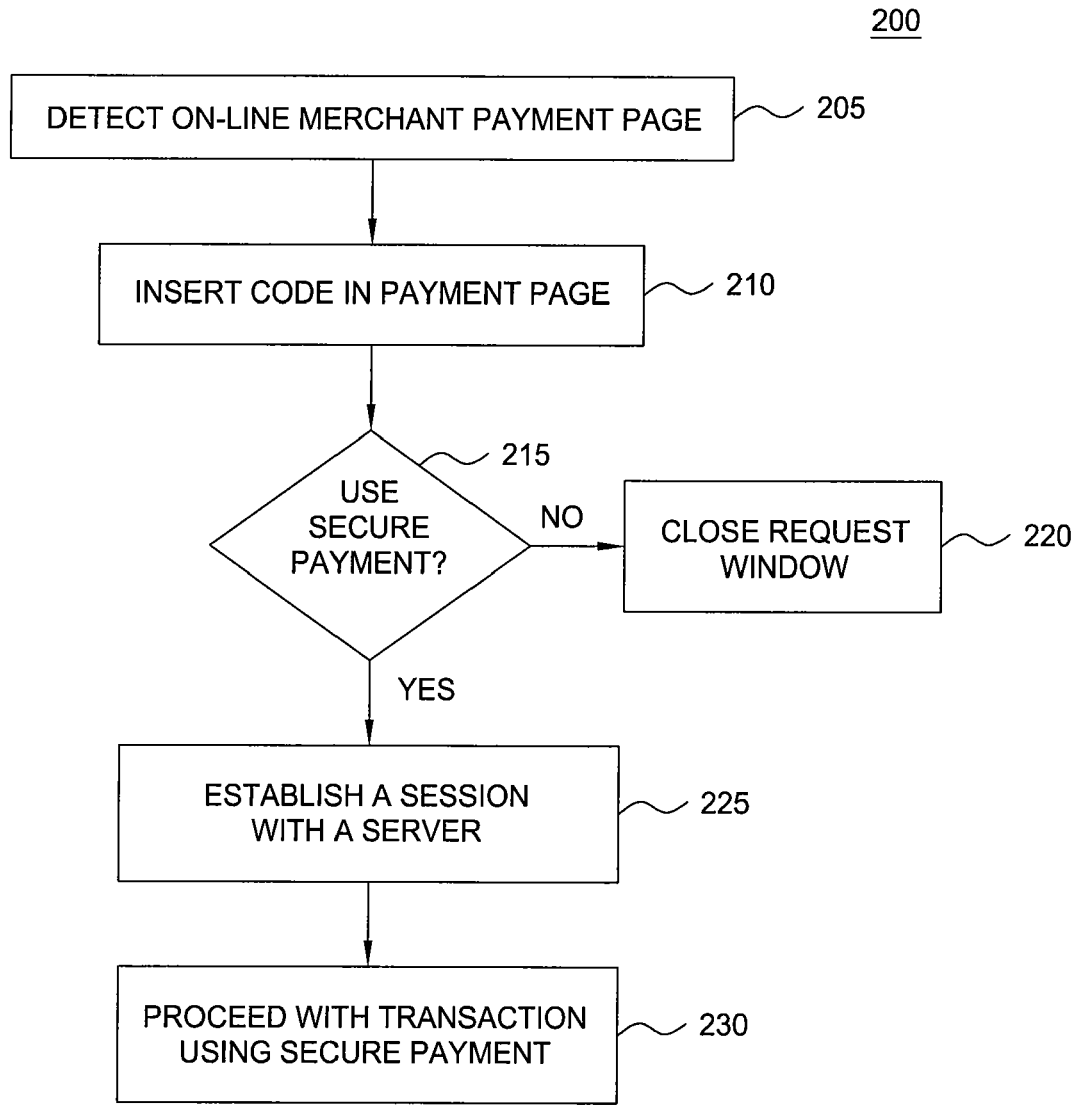
FIG. 2 is a flow chart of method steps for a process that establishes a session during an on-line transaction, according to one embodiment of the invention.

FIG. 2 is a flow chart of method steps for a process 200 that establishes a session during an on-line transaction, according to one embodiment of the invention. Although the method steps are described in the context of the system of FIG. 1, any system configured to perform the method steps, in any order, is within the scope of the invention. Generally, the process 200 applies a combination of an in-window pop-up (i.e. a request window) and a standard window pop-up wired together in such a way that launching the session in the pop-up is established without getting blocked by pop-up blockers.

The process 200 begins with detecting a merchant payment page in step 205. In one embodiment, the security agent 110 automatically activates after detecting the payment webpage of the on-line merchant. For instance, the security agent 110 may detect the on-line merchant payment webpage by reading the source code of the webpage, such as the HTML code for credit card information, e.g. card type, expiry date, CVV2 code, etc., or by reading a trigger, such as a header or an identification number embedded in the payment webpage. In another embodiment, the user activates the security agent 110 to perform a secure payment transaction. For instance, the user may select a button on the webpage to activate the security agent 110. In a further embodiment, the on-line merchant 145 activates the security agent 110 and requires the user to use the security agent 110 during the secure payment transaction.

In step 210, the security agent 110 inserts a code in the payment page of the on-line merchant 145. Generally, the code is used to create an in-window pop-up in the form of a request window. As described herein, the request window prompts the user to determine if the user would like to use "securepay" during the on-line payment transaction, which is a secure payment process as described in U.S. patent application Ser. No. 11/562,353.

The code may be any type of computer code that is configured to create the in-window pop-up. In one embodiment, the code is a section of HTML (Hypertext Markup Language). In another embodiment, the code may be a <DIV> element inserted in a webpage using javascript or BHO technology. As known, the <DIV> element is used to define a section of a document. In context of the present invention, the content within the <DIV> tag may be used to define the structure, appearance and content of the in-window pop-up. The section of HTML is scripted to behave like a window or dialog and appear as a pop-up to allow interaction with its contents. In this embodiment, the security agent 110 may insert two <DIV> layers, a first layer that disables the payment page and a second layer that starts the interaction with user. The in-window pop-up contents are scripted to get a user acceptance, such as a user click, before launching a standard pop-up window to establish a secure session with another web application. This arrangement allows the launch of a Web browser pop-up that is secure enough not to alert the pop-up blocker or raise a security concern since this arrangement involves user acceptance.

Figure 3:
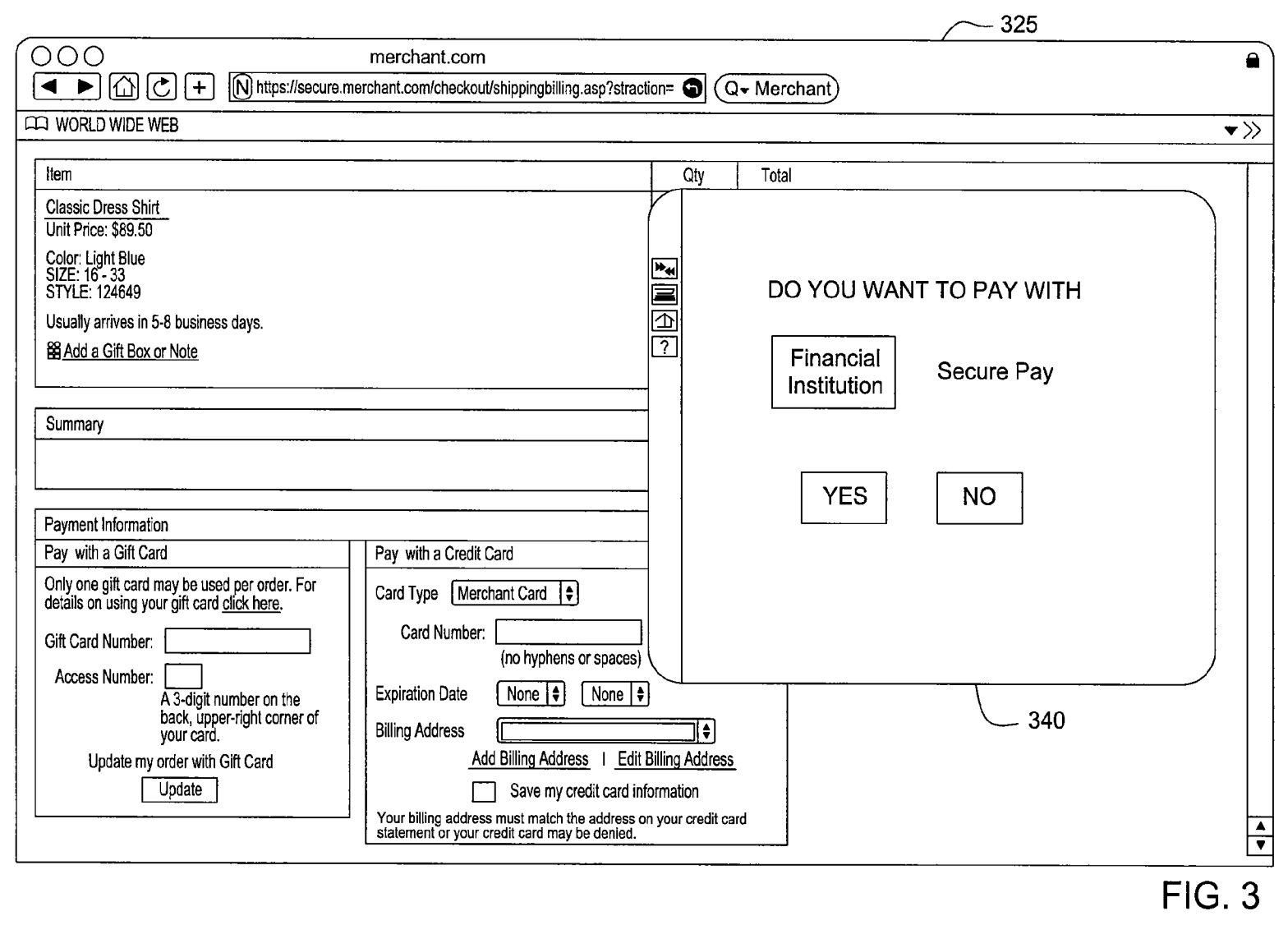

In step 215, the user is prompted to determine if the user would like to use "securepay." Referring now to FIG. 3, the user is at a payment page 325 of the on-line merchant 145. At this point, a request window 340 (i.e. in-window pop-up) is displayed to prompt the user regarding the use of "secure-pay". In other words, the user is given an option to pay for the selected item via "securepay" or the user may decline the use of "securepay" and pay for the selected item via a standard on-line payment process. It should be noted that the request window is not blocked by the pop-up blocker since the request window was generated as part of the HTML for the payment page 325. In one embodiment, the request window 340 is generated by the preference server 155. Further, if there are multiple institutions available to the user, the preference server 155 will indicate which institution the user prefers to use during the on-line transaction.

Referring back to FIG. 2, if the answer given by the user in step 215 is "no", then, in step 220, the request window is closed. If the answer given by the user in step 215 is "yes", then, in step 225, a new session with a server is established by using a standard window pop-up. The server may be the authentication server 125 which would perform the user authentication. Once the user is authenticated a new session is established with the securepay server 150 where the user can generate virtual cards. It should be noted that the session with the securepay server 150, the authentication server 125 and the institution server 140 is a completely separate session from the session relating to the on-line payment page. Further, it should be noted that the standard window pop-up that is used to establish the session will not be blocked by the pop-up blocker since step 215 involves acceptance by the user before launching the standard window pop-up. Additionally, since a new session is created, the authentication server 125 allows the session to be established, rather than considering the session as a random request, such as a hacking attempt.

Figure 4:
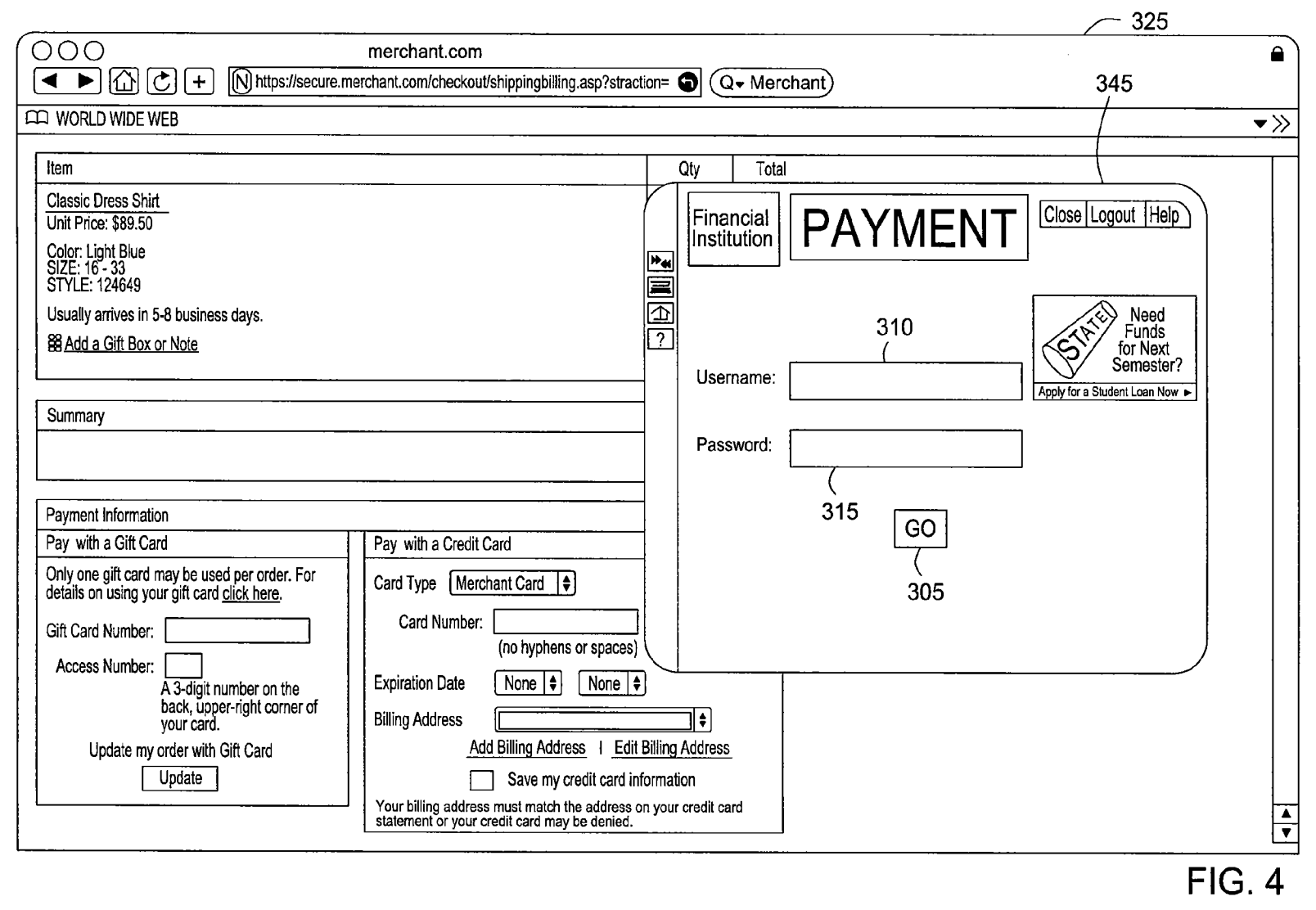

In step 230, the user proceeds with the on-line transaction using the secure payment process. Referring now to FIG. 4, the authentication server 125 generates a pop-up window 345 that prompts the user to enter a username into a box 310 and a password in a box 315. After the information is entered into the boxes 310, 315, the user selects a button 305 to continue the secure payment process.

Figure 5:
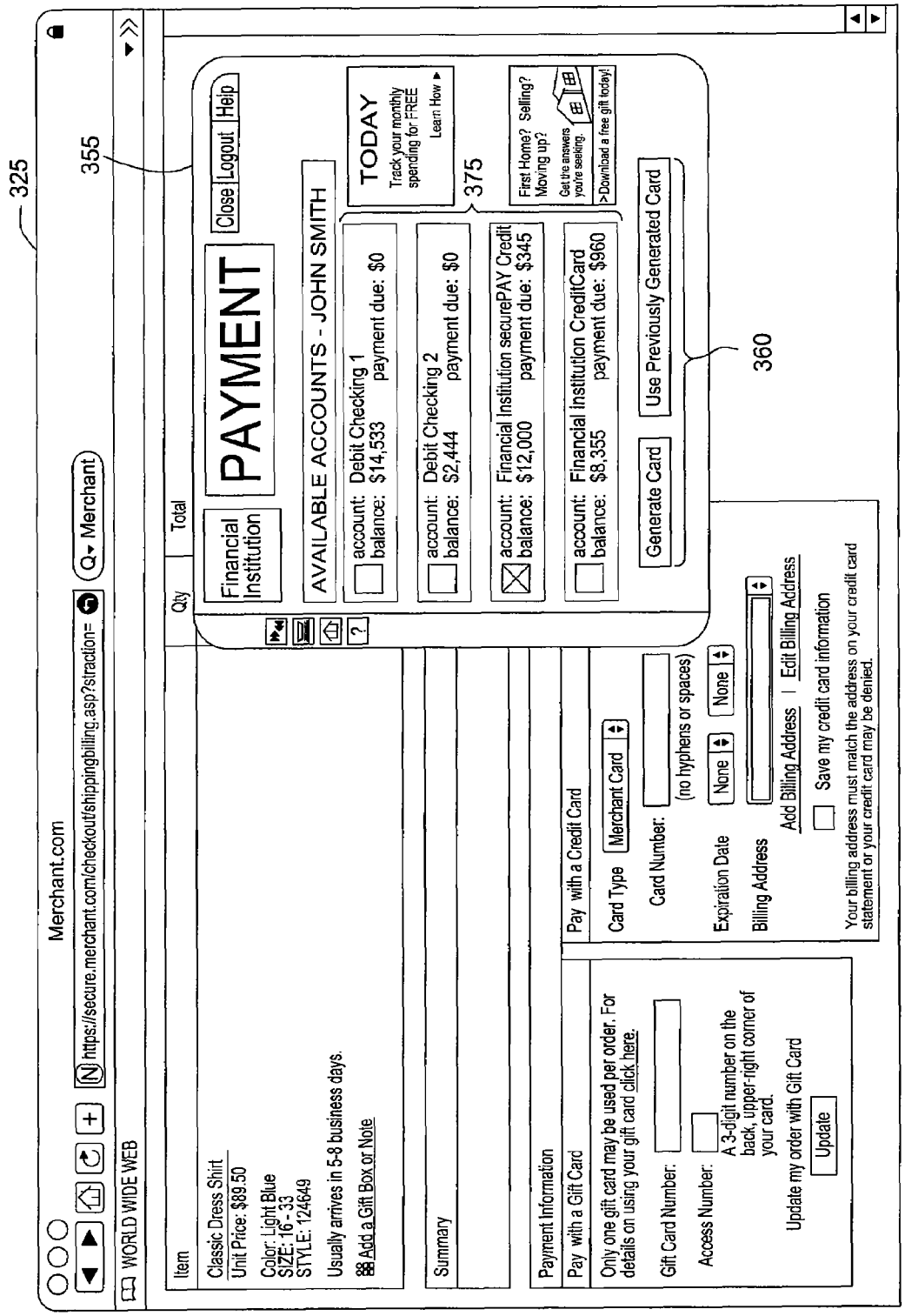

In FIG. 5, the securepay server 150 displays an account list 375 via a pop-up window 355 which is a list of accounts available to pay the on-line merchant 145. Essentially, the user can select the account from the list of accounts presented by the securepay server 150 from data generated by the institution server 140, and then the securepay server 150 facilitates the payment to the on-line merchant 145. As also shown in FIG. 5, the user has the option of selecting whether a new virtual card is generated or a previously generated card 360 is used during the on-line transaction.

As shown in FIG. 5, the account list 375 is from a single institution. It is to be noted, however, that multiple account lists from multiple institutions may be displayed via the pop-up window 355 without departing from principles of the present invention. In another embodiment, a second pop-up window could be generated to display an account list from a second institution while the pop-up window 355 displays the account list 375 from a first institution. In other words, the user may have a session with the first institution while simultaneously having a session with the second institution. The use of multiple pop-up windows allows the user to establish multiple sessions with multiple institutions at the same time.

In FIG. 6, a pop-up window 365 displays the virtual card generated by the securepay server 150. The user has the option of selecting to revise the virtual card or generate a new virtual card 370. After the virtual card is generated, the payment information from the session with the securepay server 150 is transferred to the session relating to the payment page of the on-line merchant 145. The transfer of payment information from one session to another session may be accomplished in a number of ways. For example, the user may copy the payment information from the session with the securepay server 150 and paste the payment information in the appropriate payment fields 380 on the payment page 325. In another example, the user may drag the payment information from the session with the securepay server 150 and drop the payment information in the appropriate payment fields 380 on the payment page 325. In another example, the security agent 110 may transfer the payment information and populate the appropriate payment fields 380 on the payment page 325. In a further example, a java script code that is running within the pop-up window 365 may transfer the payment information and populate the appropriate payment fields 380 on the payment page 325. As shown in FIG. 6, the payment fields 380 may include a card type, a card number and an expiration date. In one embodiment, the card type may be merchant card, such as securepay card, a MasterCard®, a Visa® or any other payment card.

Utilizing the virtual card has several benefits. For instance, the virtual card has a similar format as a conventional credit card number and therefore the on-line merchant 145 does not have to modify the format of the payment webpage 325 in order to accept the payment from the payment instrument created by the securepay server 150. If the virtual card is a one-time card, then another benefit is that the account number can be used only once and therefore even if the number is stolen, the account number has no value apart from the current transaction. In any case, the payment information is transferred from the session with the securepay server 150 to the payment page of the on-line merchant 145 and then the user completes the on-line transaction following the steps set forth by the on-line merchant 145.

The invention has been described herein in relation to the establishment of a session with an institution server during an on-line transaction. However, it should be understood that multiple sessions may be established with any number of institution servers without departing from the principles of the present invention. For example, if the user would like to purchase an item that requires a large sum of funds, then the user may want to establish a session with one institution server to supply a portion of the funds and also establish a session with another institution server to supply another portion of the funds. As set forth herein, each session may be established with the respective server via a separate pop-up window or via the same pop-up window.

While the foregoing is directed to embodiments of the present invention, other and further embodiments of the invention may be devised without departing from the basic scope thereof, and the scope thereof is determined by the claims that follow.

The invention claimed is:

1. A computer-implemented method for establishing a session for an on-line payment transaction, the method comprising:
    detecting an on-line payment page by evaluating source code associated with the on-line payment page, wherein the on-line payment page is displayed on a display device within a web browser application executing on a computer system;
    inserting additional code into the on-line payment page, without any user input, in response to detecting the on-line payment page, wherein the additional code causes a display area to be displayed on the display device within the on-line payment page that mimics the appearance of a pop-up window;
    prompting a user via the display area to select whether to use a secure payment process in processing the on-line payment transaction;
    displaying a first pop-up window on the display device in response to the user selecting to use the secure payment process; and
    establishing a network session between the first pop-up window and at least one server.

2. The method of claim 1, further comprising proceeding with the on-line payment transaction using a secure payment process.

3. The method of claim 2, wherein the secure payment process includes accessing an account on an institution server for use during the on-line payment transaction.

4. The method of claim 1, wherein the additional code is a section of HTML for the on-line payment page.

5. The method of claim 1, wherein the display area is an in-window pop-up.

6. The method of claim 1, further comprising displaying a second pop-up window on the display device and establishing a second network session between the second pop-up window and a second server.

7. The method of claim 1, wherein the network session with the at least one server is separate from the on-line payment transaction.

8. The method of claim 1, wherein the first pop-up window is configured to display user account information generated by data sent by an institution server.

9. The method of claim 1 wherein the at least one server is an authentication server that is configured to authenticate the user.

10. The method of claim 1, wherein the at least one server is a securepay server that is configured to generate a virtual card for use in the on-line payment transaction.

11. The method of claim 1, wherein the at least one server is a preference server that is configured to select an institution server based upon preferences established by the user.

12. A computer-readable medium including a set of instructions that when executed by a processor cause the processor to establishing a session for an on-line payment transaction, by performing the steps of:

detecting an on-line payment page by evaluating source code associated with the on-line payment page, wherein the on-line payment page is displayed on a display device within a web browser application executing on a computer system;

inserting additional code into the on-line payment page, without any user input, in response to detecting the on-line payment page, wherein the additional code causes a display area to be displayed on the display device within the on-line payment page that mimics the appearance of a pop-up window;

prompting a user via the display area to select whether to use a secure payment process in processing the on-line payment transaction;

displaying a first pop-up window on the display device in response to the user selecting to use the secure payment process; and establishing a network session between the first pop-up window and at least one server.

13. The computer-readable medium of claim 12, wherein the additional code is a section of HTML for the on-line payment page.

14. The computer-readable medium of claim 12, wherein the display area is an in-window pop-up.

15. The computer-readable medium of claim 12, wherein the first pop-up window is configured to display user account information generated by data sent by an institution server.

16. The computer-readable medium of claim 12, further comprising displaying a second pop-up window and establishing a second network session between the second pop-up window and a second server.

17. A system for establishing a session during an on-line transaction session, the system comprising:

a computing device including a processor, a display device, and a memory, wherein the memory includes a security agent, that when executed by the processor, is configured to:

detect an on-line payment page by evaluating source code associated with the on-line payment page, wherein the on-line payment page is displayed on the display device within a web browser application executing on the computing device, and insert additional code into the on-line payment page, without any user input, in response to detecting the on-line payment page, wherein the additional code causes a display area to be displayed on the display device within the on-line payment page that mimics the appearance of a pop-up window;

a preference server configured to:

prompt a user via the display area to select whether to use a secure payment process in processing the on-line payment transaction, and cause a first pop-up window to be displayed on the display device in response to the user selecting to use the secure payment process; and an authentication server configured to establish a network session between the first pop-up window and at least one server.

18. The system of claim 17, wherein the preference server is further configured to cause a second pop-up window to be displayed on the display device and the authentication server is further configured to establish a second network session between the second pop-up window and a second server.

19. The system of claim 17, wherein the additional code is a section of HTML for the payment page.

20. The system of claim 17, wherein the display area is an in-window pop-up.

21. The system of claim 17, wherein the first pop-up window is configured to display user account information generated by data sent by an institution server.

* * * * *